(12) United States Patent
Mori et al.

(10) Patent No.: US 8,153,194 B2
(45) Date of Patent: Apr. 10, 2012

(54) METHOD FOR PRODUCING LAMINATE

(75) Inventors: Katsuhiro Mori, Shunan (JP); Noriyuki Fukada, Shunan (JP); Naoto Takahashi, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 843 days.

(21) Appl. No.: 12/224,329

(22) PCT Filed: Feb. 27, 2007

(86) PCT No.: PCT/JP2007/053572
§ 371 (c)(1),
(2), (4) Date: Aug. 25, 2008

(87) PCT Pub. No.: WO2007/102330
PCT Pub. Date: Sep. 13, 2007

(65) Prior Publication Data
US 2009/0011126 A1 Jan. 8, 2009

(30) Foreign Application Priority Data

Mar. 1, 2006 (JP) ................................. 2006-054964

(51) Int. Cl.
*B05D 3/12* (2006.01)
(52) U.S. Cl. .......................................... 427/240; 118/52
(58) Field of Classification Search .................. 427/240, 427/294; 118/326, 319, 320, 52, 612, 56, 118/500, 501, 504, 7, 712, 715, 725; 134/153, 134/902; 137/8; 396/611, 604
See application file for complete search history.

(56) References Cited

U.S. PATENT DOCUMENTS

| 5,075,171 A | 12/1991 | Kondo et al. |
| 5,769,945 A * | 6/1998 | Davis et al. ..................... 118/52 |
| 2006/0269741 A1 | 11/2006 | Izumi et al. |

(Continued)

FOREIGN PATENT DOCUMENTS
EP 1602479 A1 12/2005
(Continued)

OTHER PUBLICATIONS

Search Report and Written Opinion dated Nov. 23, 2010 in Singaporean Application No. 200806165-7.

*Primary Examiner* — Timothy Meeks
*Assistant Examiner* — Irwin Bailey
(74) *Attorney, Agent, or Firm* — Birch, Stewart, Kolasch & Birch, LLP

(57) ABSTRACT

The invention intends to provide a method for preventing deterioration in quality of the primer layer resulting from spinning-off and reattachment of a primer liquid on forming a polyurethane primer layer on a substrate for an eyeglass lens or the like using a coating composition containing a moisture-curing polyurethane resin.

The method for producing a laminate according to the present invention comprises performing spin-coating while a spin-coating apparatus is forcefully evacuated through the side wall and/or the bottom thereof, on producing a laminate by spin-coating the surface of a substrate with a coating composition containing a moisture-curing polyurethane resin. More preferably, the spin-coating apparatus comprises a top cover, a lower chamber, and a rotatable substrate supporting device installed in the lower chamber; exhaust ports are provided in the top cover and at the bottom of the lower chamber; and the substrate supporting device is housed in a cylinder member wherein the aperture of at the lower end is larger than the aperture at the upper end.

11 Claims, 6 Drawing Sheets

U.S. PATENT DOCUMENTS

2007/0071890 A1 * 3/2007 Yoshihara et al. ............ 427/240

FOREIGN PATENT DOCUMENTS

| EP | 1602479 A1 * | 12/2005 |
| JP | 1-144520 A | 6/1989 |
| JP | 3-60761 A | 3/1991 |
| JP | 6-275506 A | 9/1994 |
| JP | 8-335336 A | 12/1996 |
| JP | 10-303101 A | 11/1998 |
| JP | 2001-023879 A | 1/2001 |
| JP | 2001023879 A * | 1/2001 |
| JP | 2003-91885 A | 3/2003 |
| JP | 2004-261973 A | 9/2004 |
| JP | 2005-190532 A | 7/2005 |
| JP | 2005-199683 A | 7/2005 |
| JP | 2005190532 A * | 7/2005 |
| WO | WO 2004/078476 A1 | 9/2004 |

* cited by examiner

METHOD FOR PRODUCING LAMINATE

TECHNICAL FIELD OF THE INVENTION

The present invention relates to a method for producing a laminate. More specifically, the present invention relates to a method for preventing deterioration of quality of a coating film caused by spinning-off and reattachment of a coating liquid upon forming a polyurethane layer on a substrate for an eyeglass lens or the like.

BACKGROUND ART

Photochromic eyeglasses are eyeglasses which lenses are quickly colored in an outdoor irradiated with light containing UV rays such as sunlight to function as sunglasses and which are discolored in an indoor irradiated with no such light to function as ordinary transparent spectacles, and demands thereto grow larger in recent years.

As a method for producing plastic lenses having a photochromic property, various methods have been proposed. As one of these methods, there is known coating method, wherein a layer having a photochromic property (hereinafter, called photochromic coating layer) is formed on the surface of a plastic lens using a coating liquid containing a photochromic compound (hereinafter, called photochromic coating agent).

However, the photochromic coating agent has generally poor adhesion to the surface of a plastic lens substrate, so that a primer layer is formed on the surface of the lens substrate prior to forming the photochromic coating layer. As a resin for forming such a primer layer, a coating composition containing a moisture-curing polyurethane resin has been proposed (Patent Document 1).

On forming a primer layer or a photochromic layer by the coating method, the spin-coating method is generally employed. In the spin-coating method, while a lens substrate is spun around its central axis, a coating liquid is dropped onto the surface of the substrate, so that the coating liquid is spread by centrifugal force caused by spinning to form an uniform coating film.

The spin-coating method is a technique mainly employed for forming a resist film in photolithography of semiconductor wafers or forming a recoding film on a substrate for optical disks. Spin-coating apparatuses have, therefore, specification suitable to the materials of these films. There have been various proposals on spin-coating apparatuses in accordance with substrates to be coated or materials of coating films (Patent Document 2 and Patent Document 3).

The market size of photochromic eyeglass lenses is not so large at present, and there is no spin-coating apparatus specified for forming a primer layer or a photochromic layer on a lens substrate. In addition, there are quite few proposals on spin-coating apparatuses with special attention to producing photochromic eyeglass lenses, particularly for forming a primer layer. Under present circumstances, therefore, a general-purpose spin-coating apparatus, which is used for forming a resist film in photolithography of semiconductor wafers or forming a recoding film on a substrate for optical disks, is utilized for producing photochromic eyeglass lenses.

[Patent Document 1] Japanese Patent Laid-open Publication No. 261973/2004

[Patent Document 2] Japanese Patent Laid-open Publication No. 190532/2005

[Patent Document 3] Japanese Patent Laid-open Publication No. 23879/2001

DISCLOSURE OF THE INVENTION

Problems to be Solved by the Invention

When the present inventors formed a primer layer using a coating composition containing a moisture-curing polyurethane resin by spin-coating with a conventional spin-coating apparatus as shown in FIG. 6, they found the following problems.

When a coating composition (primer liquid) containing a moisture-curing polyurethane resin is dropped on the surface of a lens substrate and the substrate is spun, the primer liquid spread by centrifugal force caused by spinning to form a uniform coating film, and excess primer liquid is spun-off. At this time, the floating primer liquid sometimes reattaches to the surface of the lens substrate. When the primer liquid reattached is in liquid state, it is incorporated into the primer liquid spreading on the surface, and the possibility of damaging quality of the coating film is low. However, when the primer liquid spun-off solidifies into fine particles and the fine particles reattach to the coating film, the uniformity of the coating film is heavily damaged. The coating composition containing a moisture-curing polyurethane resin highly tends to solidify, so that the primer liquid spun-off is readily to become fine particles. When the uniformity of the primer layer is damaged, the photochromic layer formed thereon also becomes non-uniform, whereby the commercial value of the resulting lens is extremely lowered.

Therefore, it is an object of the present invention to provide a method for preventing deterioration in quality of a primer layer on producing a polyurethane primer layer on a substrate for an eyeglass lens or the like using a coating composition containing a moisture-curing polyurethane resin.

Means to Solve the Problems

The present invention provides the following means for solving the above-described problems:

(1) A method for producing a laminate comprising a substrate and a polyurethane layer thereon, the method comprises the step of coating the substrate with a coating composition containing a moisture-curing polyurethane resin by spin-coating, wherein adhesion of the coating composition spun-off and/or a cured material thereof to a coating film of the coating composition is prevented while spin-coating;

(2) The method for producing a laminate according to (1), wherein the coating step is carried out in a space divided by a side wall and bottom wall, and the space is forcefully evacuated through the side wall and/or the bottom wall while spin-coating;

(3) the method for producing a laminate according to (2), wherein the coating step is carried out by using a spin-coating apparatus comprising a top cover, a lower chamber, a rotatable substrate supporting device installed in the lower chamber;

an exhaust port is provided at the bottom of the lower chamber; and said substrate supporting device is housed in a cylinder member having openings at the upper and bottom ends thereof;

(4) the method for producing a laminate according to (3), wherein the aperture at the bottom end of the cylinder member is larger than the aperture at the upper end thereof;

(5) the method for producing a laminate according to (3), wherein the top cover of the spin-coating apparatus has an exhaust port; and (6) a method for producing a laminate according to (1), wherein the coating step is carried out by using a spin-coating apparatus comprising a rotatable substrate supporting device and a cylindrical cover shielding the rotation axis of the substrate supporting device.

Effects of the Invention

According to the present invention, because spin-coating is performed while a spin-coating apparatus is forcefully evacuated through the side wall and/or the bottom thereof, the primer liquid spun-off during spin-coating and cured material thereof are effectively evacuated out of the spin-coating apparatus. Accordingly, the possibility that floating fine particles such as the cured material reattach to the coating film (uncured primer layer) is lowered, and a primer layer with high quality is formed. Consequently, quality and productivity of photochromic lenses are improved.

Further, according to another embodiment of the present invention, spin-coating is performed while the rotation axis of a spin-coating apparatus is shielded with a cylindrical cover, whereby influence of turbulent flow caused by rotation of the axis is suppressed inside the apparatus. As a result, random convection of floats inside the apparatus is suppressed and the possibility that floating fine particles such as the cured material reattach to the coating film is still more lowered.

Even using a conventional spin-coating apparatus as shown in FIG. 6, products with good quality could be obtained. However, in order to obtain good products, conditions such as rotation speed, rotation time and atmosphere had to be strictly controlled, and even though such strict control was performed, it was still difficult to avoid creation of defective products. To the contrary, in the method of the present invention, the percentage of defective products created is greatly reduced (yield is greatly increased) even though production conditions are not so strictly controlled.

DESCRIPTION OF THE SYMBOLS

Figure 1:
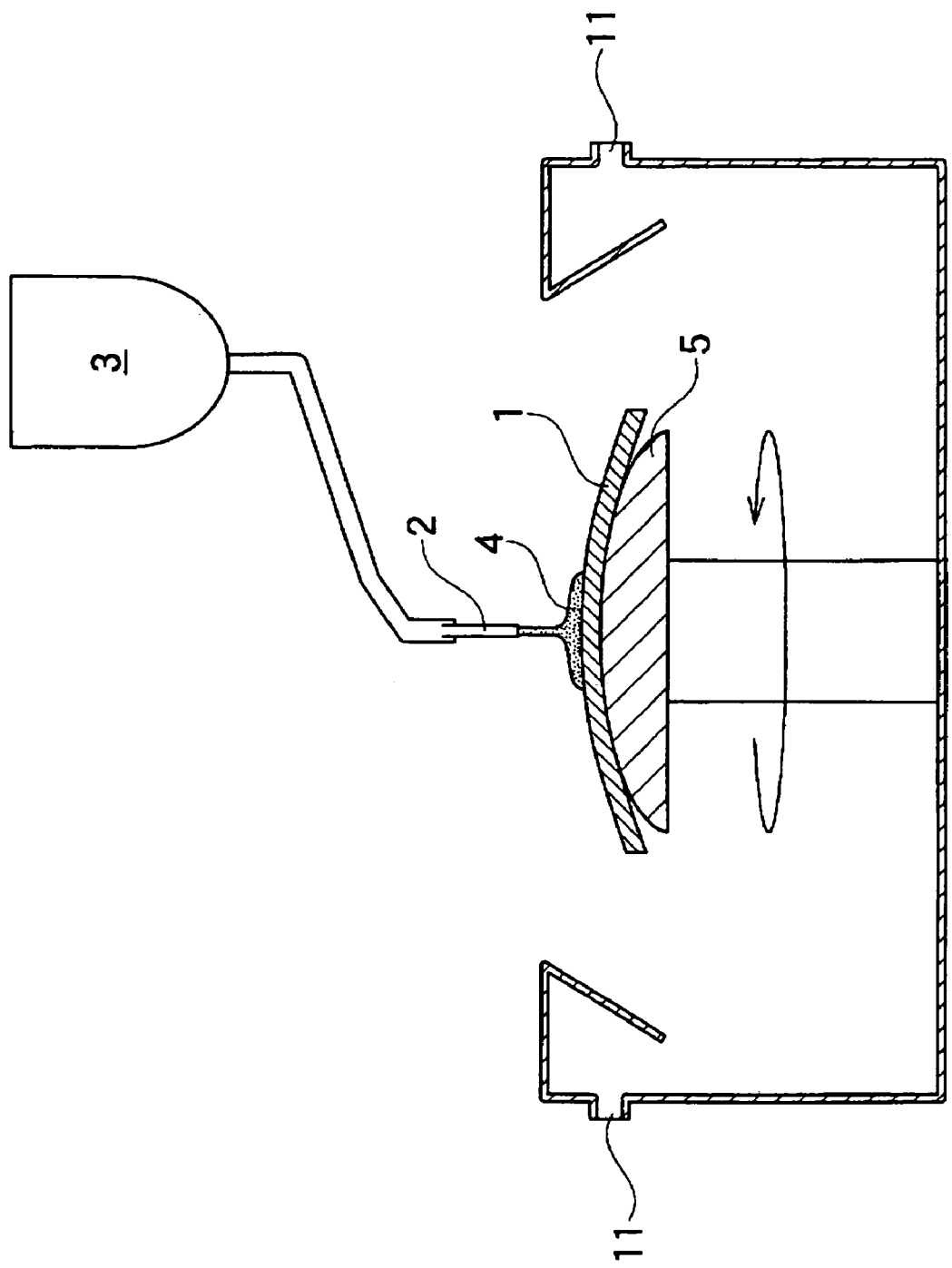
FIG. 1 is a sectional view illustrating an embodiment of a spin-coating apparatus used in the present invention.

1: substrate
2: nozzle
3: barrel
4: primer liquid
5: substrate supporting device
10: spin-coating apparatus
11: exhaust port
12: top cover
13: lower chamber
14: exhaust port
15: cylinder member
16: ceiling plate
17: cylindrical cover

BEST MODE FOR CARRYING OUT THE INVENTION

In the following, embodiments of the present invention will be specifically described with reference to drawings.

The present invention relates to a method for producing a laminate comprising a substrate and a polyurethane layer thereon which comprises the step of coating the substrate with a coating composition containing a moisture-curing polyurethane resin by spin-coating. Here, a characteristic feature of the present invention is that adhesion of the coating composition spun-off and/or a cured material thereof to a coating film of the coating composition is prevented while spin-coating. The present invention includes an embodiment in which the coating step is carried out in a space divided by a side wall and bottom wall, and the space is forcefully evacuated through the side wall and/or the bottom wall while spin-coating. Further, the present invention includes another embodiment which characterized by that the coating step is carried out by using a spin-coating apparatus comprising a rotatable substrate supporting device and a cylindrical cover shielding the rotation axis of the substrate supporting device.

The coating composition (hereinafter, called "primer liquid") containing a moisture-curing polyurethane resin is in itself publicly known. For example, a primer liquid described in Patent Document 1 (Japanese Patent Laid-open Publication No. 261973/2004) described above may be used without any particular limitations.

The moisture-curing (or moisture-curable) polyurethane resin used in the present invention means isocyanate group-containing compounds in which a part of plural isocyanate groups present in a molecule is reacted with moisture in the air to produce carbamic acid and then it is decarboxylated to produce amines, subsequently the produced amines are reacted with the remaining isocyanate groups to produce urea bonds, whereby they are cross-linked and cured, or compounds which are precursors of such compounds or a combination of the compounds. Capable of being used are, for example, polyurethane oligomers or polyurethane polymers in which a molecular weight is controlled to a relatively high level, suitably 300 to 5,000, particularly 500 to 3,000 in terms of a number average molecular weight (Mn) and in which an average content of isocyanate groups present at terminals in one molecule is controlled to 0.001 to 50 mole %, preferably 0.1 to 10 mole % and most preferably 0.5 to 5 mole %; "isocyanate compounds or derivatives thereof" which are the precursors of the above polyurethane oligomers or polyurethane polymers or "the combinations of the above isocyanate compounds or derivatives thereof and active hydrogen-containing compounds". The average content (mole %) of isocyanate groups referred herein means a value obtained by quantifying a mole number of isocyanate groups present in a predetermined amount of a compound by chemical analysis, dividing the mole number of the isocyanate groups thus obtained by a mole number (a value obtained by dividing the predetermined amount of a weight by a number average molecular weight) of the compound contained in the predetermined amount to thereby, calculating a mole number of the isocyanate groups present in one molecule of the compound by further dividing the above mole number by a molecular weight (number average molecular weight) of the compound and expressing the resulting value by %. The above moisture-curing polyurethane resin and/or precursor thereof are commercially available, for example, in the form of primers for constructional uses, and they are available industrially or as reagents.

The examples of the moisture-curing polyurethane resin which can suitably be used in the present invention include (1) aromatic isocyanate compounds such as tolylenediisocyanate, 4,4-diphenylmethanediisocyanate, xylylenediisocyanate, 1,5-naphthalenediisocyanate, tolidinediisocyanate, triphenylmethanetriisocyanate, tris(isocyanatophenyl) thiophosphate and tetramethylxylenediisocyanate; aliphatic isocyanate compounds such as trimethylhexamethylenediisocyanate, hexamethylenediisocyanate, isophoronediisocyanate, hydrogenated 4,4-diphenylmethanediisocyanate, hydrogenated xylylenediisocyanate, lysinediisocyanate, lysine ester triisocyanate, 1,6,11-undecanetriisocyanate, 1,8-diisocyanate-4-isocyanatemethyloctane, 1,3,6-hexamethylenetriisocyanate and bicycloheptanetriisocyanate and/or (2) polyisocyanate compounds or polyisocyanate oligomer compounds obtained by combining the above isocyanate compounds with compounds having active hydrogen by various methods in such a charge ratio that the isocyanate groups remain and (3) polyisocyanates containing at least one sulfur or halogen group and modified products thereof. The examples of the modified products include biuret, isocyanurates, allophanates and carbodiimides. They may be used alone or in combination of two or more kinds thereof.

Among them, preferred from the viewpoint that the excellent adhesion can be revealed at relatively low temperature are aliphatic isocyanate compounds and/or polyisocyanate compounds or polyisocyanate oligomer compounds obtained by combining the above aliphatic isocyanate compounds with compounds having active hydrogen by various methods in such a charge ratio that the isocyanate groups remain, and particularly preferred from the viewpoint of the film coating property are cyclic aliphatic isocyanate compounds and/or polyisocyanate compounds or polyisocyanate oligomer compounds obtained by combining the above cyclic aliphatic isocyanate compounds with compounds having active hydrogen by various methods in such a charge ratio that the isocyanate groups remain.

From the viewpoint that the resulting polyisocyanate compounds or polyisocyanate oligomer compounds are reacted with moisture contained in the air to be cured rapidly, aromatic isocyanate compounds and/or polyisocyanate compounds or polyisocyanate oligomer compounds obtained by combining the above aromatic isocyanate compounds with compounds having active hydrogen by various methods in such a charge ratio that the isocyanate groups remain can suitably be used as well. In this case, as result of reacting moisture with isocyanate, a urea bond is formed, and such urea bond may be contained in the polyurethane resin layer in the present invention.

The compounds having active hydrogen described above include alkylene glycols such as ethylene glycol, 1,2-propylene glycol, 1,3-butanediol, 1,4-butanediol, 1,6-hexanediol, neopentyl glycol, dipropylene glycol and diethylene glycol; polyalkylene glycols such as polypropylene glycol, polyethylene glycol and polytetramethylene glycol; poly(alkylene adipates) such as poly(diethylene adipate), poly(tetramethylene adipate), poly(hexamethylene adipate) and poly(neopentyl adipate); polycaprolactones such as poly-ε-caprolactone, polycaprolactonediol and polycaprolactonetriol; polybutanediene glycols such as poly(1,4-butadiene)glycol and poly(1,2-butadiene)glycol; poly(alkylene carbonates) such as poly (hexamethylene carbonate); polyesterpolyols; polyols having three or more hydroxyl groups such as 1,2,4-butanetriol and 1,2,6-hexanetriol; and silicone polyols. The other known active hydrogen-containing compounds can be used as well. Among them, when using polyalkylene glycols, polyols having three or more hydroxy groups, polyalkylene adipates, polyalkylene carbonates, polycaprolactones and polyesterpolyols, the heating temperature in curing can be lowered, and the base material can more surely be prevented from being thermally deformed and discolored.

The compounds having active hydrogen described above may be used alone or in combination of two or more kinds thereof. Particularly when using aromatic isocyanate compounds such as tolylenediisocyanate and 4,4-diphenylmethanediisocyanate as the primer liquid, the resulting polyisocyanate compounds or polyisocyanate oligomers are increased in crystallinity in a certain case, and two or more kinds of the compounds having active hydrogen are preferably used.

The moisture-curing polyurethane resin used in the present invention has preferably a relatively high molecular weight from the viewpoint of the rapid curing. A method for raising the molecular weight includes a method in which a remaining amount of the isocyanate groups is controlled so that it is reduced when combining the isocyanate compounds described above with the compounds having active hydrogen by various methods in such a charge ratio that the isocyanate groups remain. Or, it includes as well a method in which plural isocyanate groups present in the primer liquid are combined by a chain extending agent. Herein, the chain extending agent includes the compounds having active hydrogen described above and diamine compounds such as ethylenediamine, and among them, alkylene glycols such as 1,3-butanediol, 1,4-butanediol, propylene glycol and 1,6-hexanediol and polyalkylene glycols such as polypropylene glycol are suitably used from the viewpoint of an easiness in controlling the chain extending reaction.

It is preferred that an organic solvent is added to the above-described moisture-curing polyurethane resin as a diluting solvent as appropriate for using as a primer liquid in the present invention. The above-described diluting solvent suitably used in the present invention specifically includes, for example, butyl acetate, acetylacetone, methyl isobutyl ketone, ethylene glycol dimethyl ether, propylene glycol monoethyl ether acetate, xylene, methyl ethyl ketone, methyl acetoacetate, toluene, ethyl acetate, and the like. In the production method of the present invention, it is preferred to use at least one kind of solvent selected from these.

The content of the moisture-curing polyurethane resin in the organic solvent is preferably 5% by mass to 80% by mass on the basis of the total mass of the moisture-curing polyurethane resin and the above-described diluting solvent. It is more preferably 10% by mass to 50% by mass to reduce the residual trace of generated carbon dioxide gas with keeping good adhesion.

Further, the primer liquid used in the present invention preferably contains a leveling agent since it improves smoothness of the coating film. As the leveling agent, publicly known leveling agents may be used without any limitations. Examples of suitable leveling agents include silicone-based, fluorine-containing, acrylic-type, and vinyl-type leveling agents and the like. The amount of said leveling agent used is preferably 0.01% by mass to 5% by mass, particularly preferably 0.03% by mass to 3% by mass, on the basis of total mass of moisture-curing polyurethane resins (the mass of resin components).

Figure 2:
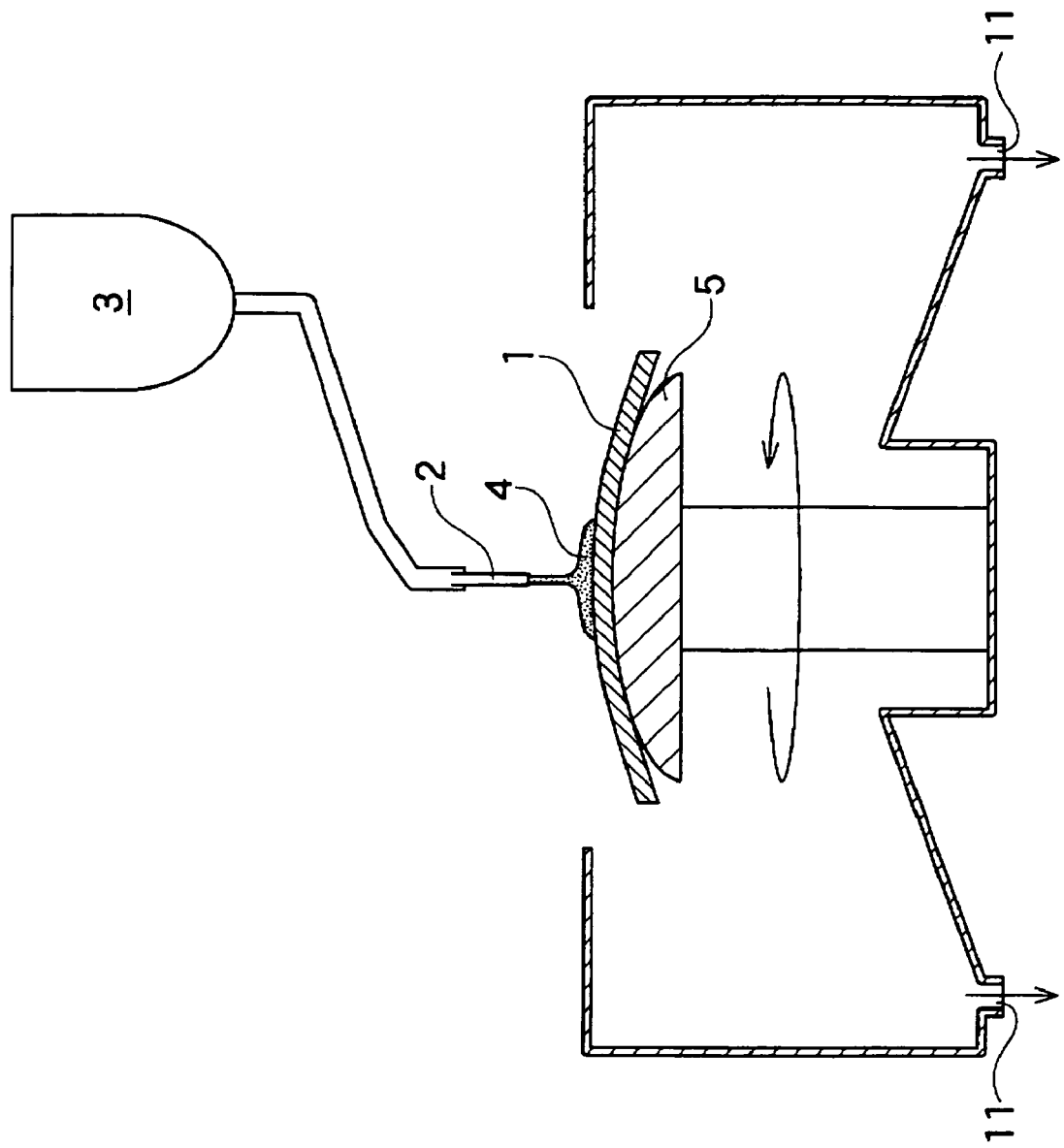
FIG. 2 is a sectional view illustrating another embodiment of a spin-coating apparatus used in the present invention.

In the present invention, the surface of the substrate 1 for as a lens or the like is spin-coated with the above-described primer liquid using the spin-coating apparatus 10 having the exhaust port 11 in the side wall thereof as shown in FIG. 1, or the spin-coating apparatus 10 having an exhaust port 11 at the bottom thereof as shown in FIG. 2. Further, there may be used a spin-coating apparatus, although not shown as drawings, having the exhaust ports 11 both in the side wall and at the bottom thereof.

In the spin coating method, as shown in FIG. 1, the primer liquid 4 is discharged from the tip of the nozzle 2 and the primer liquid is dropped onto the surface of the substrate 1 which is rotating. The substrate 1 is supported on the rotatable supporting device 5.

The nozzle 2 is connected to the barrel 3 filled with the primer liquid 4. There is provided a structure in which air pressure (nitrogen, etc.) is applied to the barrel 3 to discharge a predetermined amount of the primer liquid 4 at a constant velocity. In this structure, therefore, a predetermined amount of the primer liquid 4 can be dropped onto the surface of the substrate within a predetermined period of time by controlling on and off of the air pressure. A check valve may be installed at the connecting part of the barrel 3 and the nozzle 2 in order to prevent dripping of the liquid.

The primer liquid 4 dropped onto the surface of a substrate is developed over the surface of the substrate by centrifugal force caused by spinning of the supporting device 5, so that a film with uniform thickness is formed. At this time, excess primer liquid is spun-off by centrifugal force. Primer liquid spun-off is also called mist. The mist, which contains the moisture-curing polyurethane resin and the solvent, sometimes turns to fine particles because the solvent is evaporated after being spun-off and the moisture-curing polyurethane resin is cured. As a result, the mist and fine particles of cured material of the mist are floated in the vicinity of the substrate 1. When these floats, in particular the fine particles, reattach to the coating film, uniformity of the coating film is impaired and a photochromic layer formed thereon also becomes non-uniform. The commercial value of the resulting lens is extremely lowered.

In the present invention, the exhaust port 11 is provided in the side wall and/or in the bottom wall of the spin-coating apparatus 10, and spin-coating is performed while the spin-coating apparatus 10 is forcefully evacuated through the exhaust port 11. Floats generated during spin-coating are efficiently removed through the exhaust port 11, whereby the possibility of reattachment of these floats to the coating film is reduced. As a result, uniformity of the coating film is not damaged, and a laminate having a polyurethane layer with high quality is obtained.

Accordingly, the photochromic layer, which is formed on the polyurethane layer, also acquires high quality, so that lenses with high commercial value can be produced with high yields.

A primer liquid spun-off is pooled at the bottom of the spin-coating apparatus 10. When the exhaust port 11 is provided at the bottom, the primer liquid pooled at the bottom can be discharged therethrough.

According to the present invention, the following improvements are further proposed to enhance removal efficiency of the floats.

Figure 3:
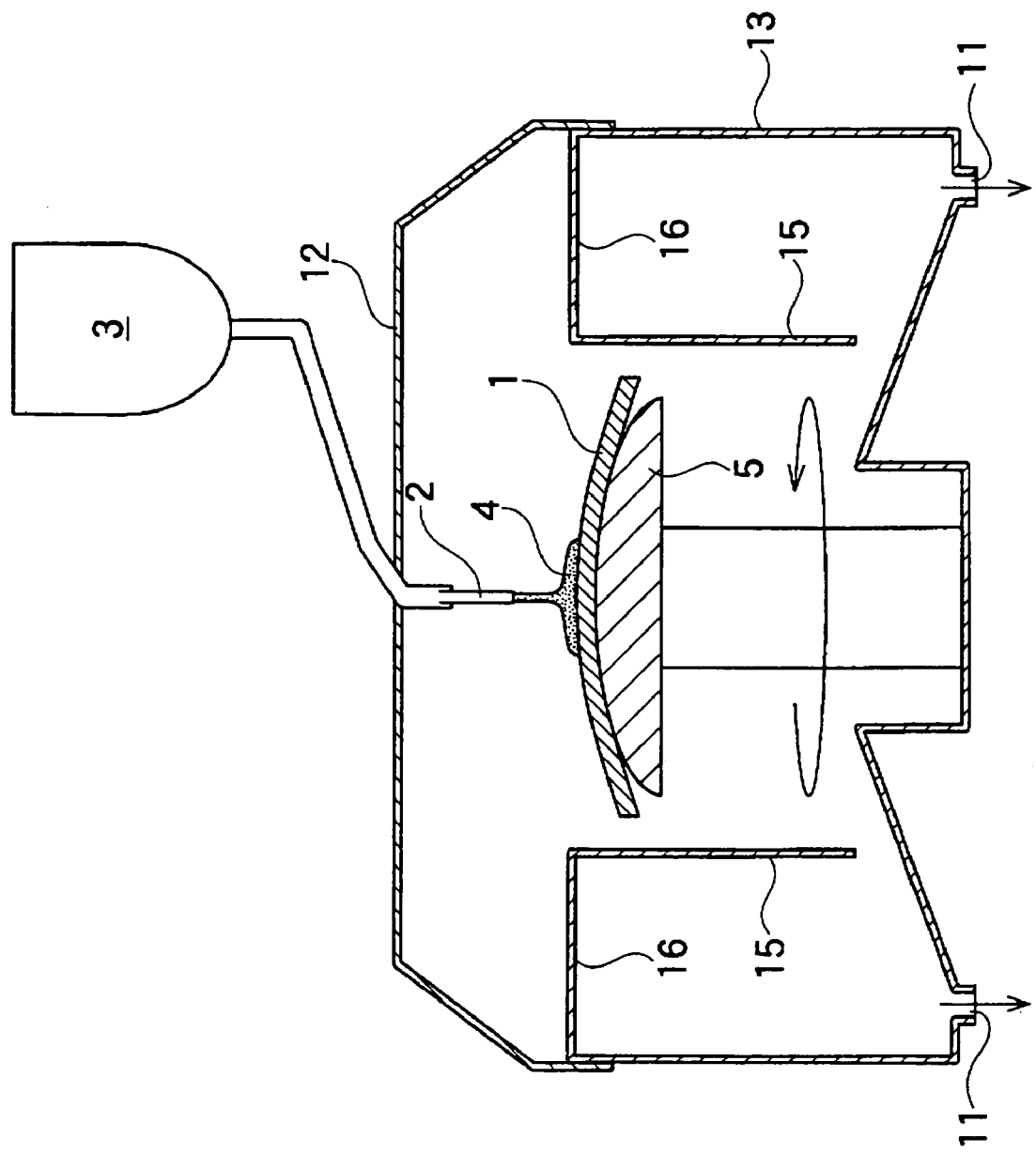
FIG. 3 is a sectional view illustrating another embodiment of a spin-coating apparatus used in the present invention.
Figure 4:
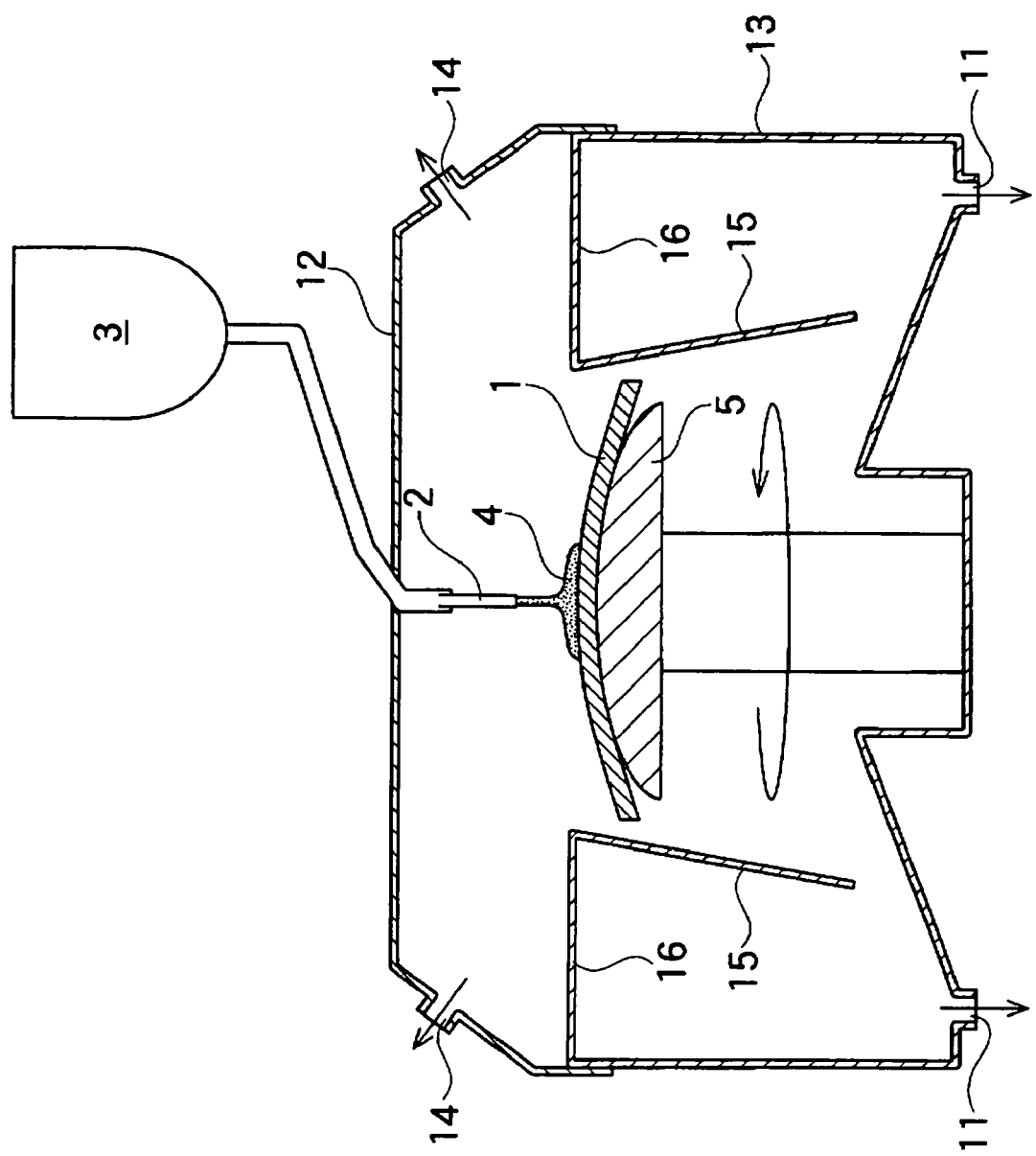
FIG. 4 is a sectional view illustrating another embodiment of a spin-coating apparatus used in the present invention.

The spin-coating apparatus 10 may be composed of the top cover 12 and the lower chamber 13 as shown in FIGS. 3 and 4. The lower chamber 13 comprises the substrate supporting device 5 and the exhaust port 11 at the bottom. Although FIGS. 3 and 4 illustrate examples where the exhaust port 11 is provided at the bottom, lower chamber 13 may adopt a structure having the exhaust port 11 in the side wall or a structure having the exhaust ports 11 both in the side wall and in the bottom wall.

By providing the top cover 12, convection in the spin-coating apparatus 10 is restricted, and consequently floats are removed more efficiently through the exhaust port 11.

The side wall of the top cover 12 may be further provided with the exhaust port 14, as shown in FIG. 4. Floats, such as the mist spun-off from the substrate 1 and the cured material of the mist, are scattered toward the upper, lateral, and lower directions of the substrate 1. Floats present over the substrate 1 mainly cause the reattachment. Providing the exhaust port 14 in the top cover 12 assures removal of floats present over the substrate 1, thereby further reducing the possibility of reattachment of floats.

Further, the substrate supporting device 5 may be surrounded with the cylinder member 15, as shown in FIGS. 3 and 4. The cylinder member 15 has openings at the upper and lower ends thereof and is supported by the ceiling plate 16, which extends from the upper end of the lower chamber 13 to the inside of the spin-coating apparatus 10. The ceiling plate 16 has an opening at the center, and the cylinder member 15 is hung downward from this opening. The space around the substrate supporting device 5 is reduced by the presence of the cylinder member 15, so that the air-flow speed is increased in the space between the cylinder member 15 and the substrate supporting device 5 when forced evacuation is performed through the exhaust port 11. In this way, floats can be removed around the substrate supporting device 5 more rapidly and more surely. Hence, the distance between the lens substrate 1 and the cylinder member 15 is preferably short and the suitable distance is approximately 5 mm to 50 mm.

In addition, the cylinder member 15 may be formed in a skirt shape being widened toward the bottom as shown in FIG. 4. That is, the aperture of the bottom end of the cylinder member 15 may be wider than that of the upper end. By forming the cylinder member 15 in such a shape, when liquid drops are spun-off from the substrate 1 and collide against the cylinder member 15, rebounding of the drops is suppressed, and generation of mist is reduced. Moreover, because the mist, if generated, is likely to be scattered toward the lower direction of the substrate supporting device 5, the possibility of reattachment of the mist or cured material thereof to the substrate 1 is lowered.

Figure 5:
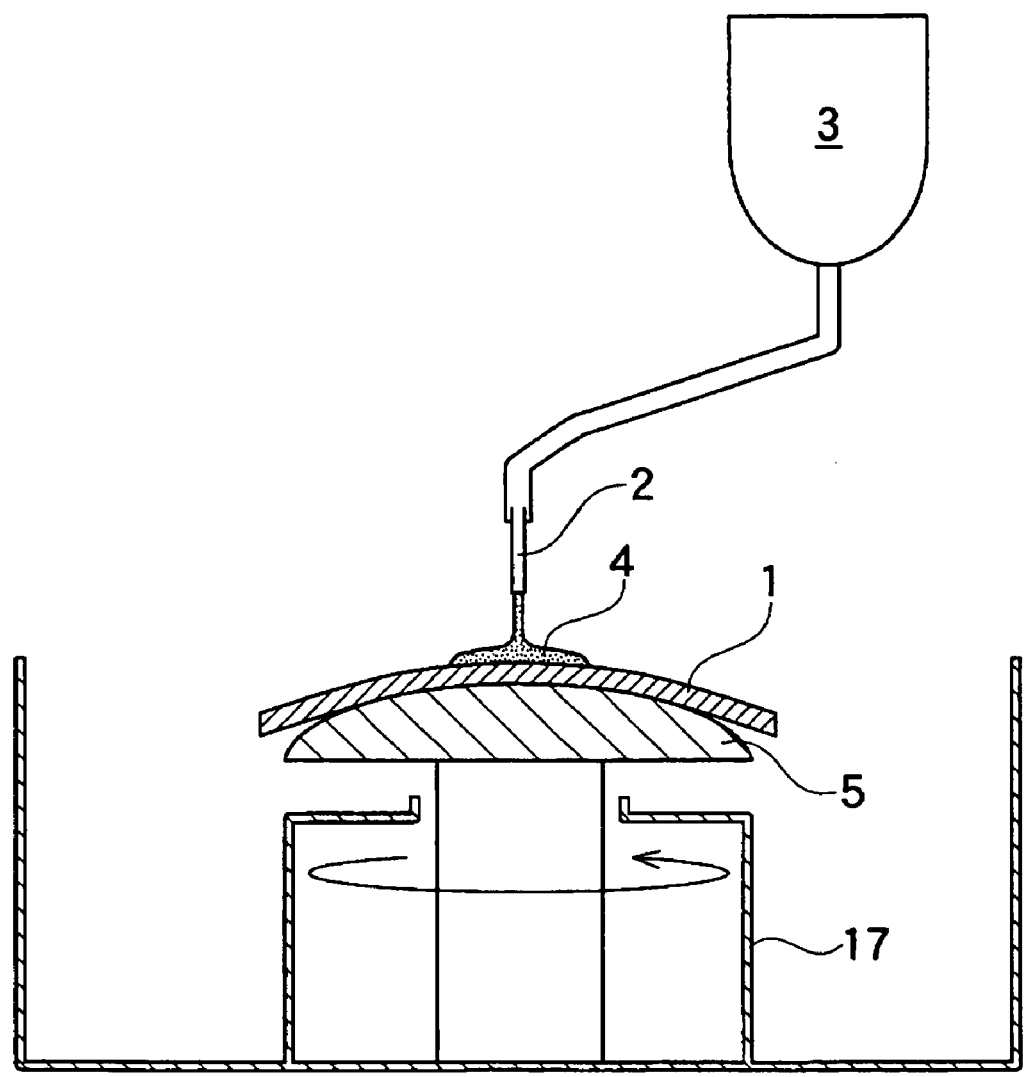
FIG. 5 is a sectional view illustrating another embodiment of a spin-coating apparatus used in the present invention.

Further, in another embodiment of the present invention, it is proposed that the rotation axis of a spin-coating apparatus is shielded with a cylindrical cover so as to suppress convection of the aforementioned mist. The rotation axis (also called spindle) of a spin-coating apparatus rotates at a high speed, sucking in air around it to generate turbulent flow. As a result, random convection of the mist is brought about, increasing the possibility of reattachment to the coating film. In the present invention, as shown in FIG. 5, generation of turbulent flow is suppressed by shielding the spindle of a spin-coating apparatus with the cylindrical cover 17. The cylindrical cover 17 may be of a cup shape having a ceiling plate as shown in FIG. 5, or may be of a simple cylindrical shape without a ceiling plate so long as generation of turbulent flow is effectively suppressed. By shielding the spindle with the cylindrical cover 17, the turbulent flow is enclosed inside the cover and influence of the turbulent flow inside the apparatus is reduced. In this way, random convection of floats inside the apparatus is prevented, whereby the possibility of the reattachment of floating fine particles such as the cured material to the coating film is reduced.

The cylindrical cover works by itself to reduce reattachment of floats. Therefore, it is not necessarily required to adopt the force evacuation through the exhaust port 11 as shown in FIGS. 1 to 4 at the same time, but using the forced evacuation through the exhaust port 11 as shown in FIGS. 1 to 4 together, reattachment of floats can be further reduced.

Further, the present invention includes various improvements besides the ones described above. For example, the spin-coating apparatus 10, the top cover 12, the lower chamber 13, the cylinder member 15, and the cylindrical cover 17 may be made of metallic materials such as stainless steel, but they are preferably made of plastic materials such as polyethylene, polypropylene, polyacetal, Teflon (registered trademark), and Delrin. Because these plastic materials have excellent separability from moisture-curing polyurethane resins, hence, mist or cured material thereof, if attached, can be easily removed.

INDUSTRIAL APPLICABILITY

According to the present invention, spin-coating is performed while a spin-coating apparatus is forcefully evacuated through the side wall and/or bottom wall, so that the primer liquid spun-off during spin-coating and cured material thereof are efficiently discharged out of the spin-coating apparatus. Consequently, the possibility of reattachment of floating fine particles such as the cured material to the coating film (uncured primer layer) is reduced, whereby a primer layer with high quality is obtained. As a result, quality and productivity of photochromic lenses are improved.

Further, according to another embodiment of the present invention, spin-coating is performed while the rotation axis of a spin-coating apparatus is shielded with a cylindrical cover, so that influence of turbulent flow caused by rotation of the axis is suppressed inside the apparatus. In this way, random convection of floats inside the apparatus is suppressed, to thereby further reducing the possibility of reattachment of floating fine particles such as the cured material to the coating film.

EXAMPLES

The present invention will be described below with reference to examples and comparative examples, but it should be construed that the present invention is in no way limited to these examples.

The lens substrates and the primer components used in the present examples are given below

[Lens Substrate]
CR (allylic resin plastic lens; refractive index=1.50)
MRA (thiourethane-based resin plastic lens; refractive index=1.60)
MRB (thiourethane-based resin plastic lens; refractive index=1.67)
TE (thioepoxy-based resin plastic lens; refractive index=1.71)
SPL (methacrylic resin plastic lens; refractive index=1.54)
SE (lens of methacrylic resin+vinyl resin; refractive index=1.60)

[Primer Ingredient]
moisture curing primer, "Takeseal PFR402TP-4", manufactured by Takebayashi Chemical Industry Co., Ltd.
moisture curing primer, "Takeseal PFR4", manufactured by Takebayashi Chemical Industry Co., Ltd.
moisture curing primer, "Urethane Primer 06", manufactured by ALPS Chemicals Mfg. Co., Ltd.
moisture curing primer, "Takenate M-402P", manufactured by Mitsui Takeda Chemicals Inc.
moisture curing primer, "Barnock DM652", manufactured by Dainippon Ink and Chemicals, Incorporated

[Leveling Agent]
SiL1: silicone-based surfactant "L7001" manufactured by Dow-Toray Corning Co., Ltd.
SiL2: silicone-based surfactant "FZ2104" manufactured by Dow-Toray Corning Co., Ltd.

Example 1

CR (allylic resin plastic lens; refractive index=1.50) was used as a lens substrate. This lens substrate was thoroughly degreased with acetone. A mixed liquid was prepared by mixing 50 parts by weight of each of a moisture curing primer "Takeseal PFR402TP-4" manufactured by Takebayashi Chemical Industry Co., Ltd. as a primer and ethyl acetate. To the resultant mixed liquid, 0.03 parts by weight of a leveling agent "FZ2104" manufactured by Dow-Toray Corning Co., Ltd. was further added, and the resultant solution was thoroughly stirred under a nitrogen atmosphere until it became uniform to obtain primer composition (A). The surface of CR was spin coated with this composition using a spin coating apparatus with structure shown in FIG. 4. The lens was subjected to curing at room temperature for 15 min to prepare a lens substrate having a primer layer.

The appearance of the lens substrate having a primer layer thus obtained was evaluated by using a fluorescent lamp placed in a box covered with black boards. The lens substrate having a primer layer was observed, using transmitted light and reflected light of the fluorescent lamp, whether there were any or no non-uniform parts in the primer layer that were created due to influence of the presence of foreign matters in the surface and inside of the primer layer. Evaluation criteria are as follows:
Good: No non-uniform parts were found.
Poor: Non-uniform parts were found.

The appearance of the lens substrate having a primer layer produced by the above-described method was evaluated as "Good."

Then, the surface of the above-mentioned lens substrate having the primer layer was spin coated with approximately 1 g of a photochromic polymerizable composition.

As the photochromic polymerizing composition, the composition prepared by the following procedures was used. A mixture was prepared by blending radical polymerizable monomers, 2,2-bis(4-methacryloyloxypentaethoxyphenyl) propane/polyethylene glycol diacrylate (average molecular weight; 532)/trimethylolpropane trimethacrylate/polyester oligomer hexaacrylate (Daicel-UCB Company, Ltd.: EB-1830)/glycidyl methacrylate at the ratio of 40/15/25/10/10 parts by mass, respectively. To 100 parts by mass of this mixture of radical polymerizable monomers, were added a photochromic compound having a structure represented by

[Formula 1]

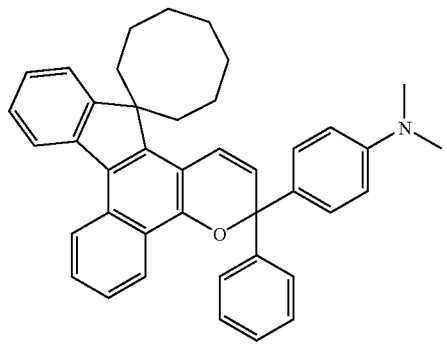

in an amount of 2.0 parts by mass, a photochromic compound having a structure represented by

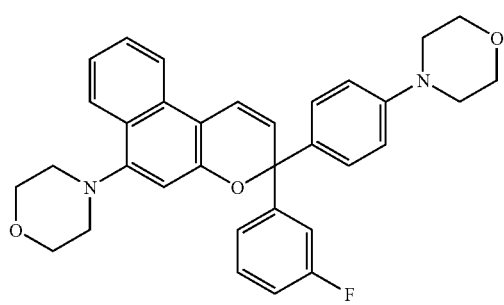

[Formula 2]

in an amount of 0.6 parts by weight, and
a photochromic compound having a structure represented by

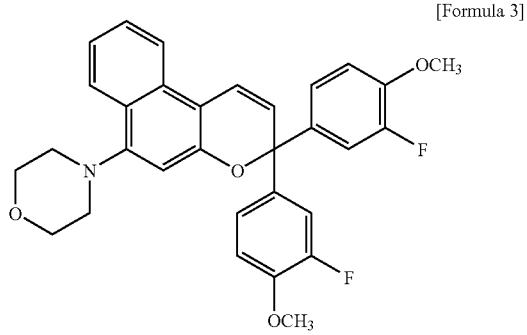

[Formula 3]

in an amount of 0.4 parts by mass. After the resultant mixture was thoroughly mixed, here were added 0.35 parts by mass of a polymerization initiator, CGI 1870 [mixture of 1-hydroxycyclohexyl phenyl ketone and bis(2,6-dimethoxybenzoyl)-2,4,4-trimethylpentylphosphine oxide (weight ratio; 3:7)], 5 parts by mass of a stabilizer, bis(1,2,2,6,6-pentamethyl-4-piperidyl)sebacate, 7 parts by mass of a silane coupling agent, γ-methacryloyloxypropyltrimethoxysilane and 0.1 parts by weight of a leveling agent (silicon-based surfactant), "L-7001" manufactured by Dow-Toray Corning Co., Ltd., and the mixture was thoroughly mixed. The resultant photochromic polymerizable composition had a viscosity of 130 cP at 25° C.

This lens having the coated surface was irradiated under a nitrogen gas atmosphere with a metal halide lamp whose output was adjusted to be 130 mW/cm$^2$ at a wavelength of 405 nm as measured on the surface of the lens for 3 min to cure the coating film. Then, the cured coating film was further heat-treated in a thermostat at 120° C. to obtain a cured photochromic thin film. The thickness of the resulting thin film can be adjusted by selecting the conditions of spin-coating. In the present invention, the thickness of the cured photochromic thin film was adjusted to be 40±1 μm.

Next, adhesion was evaluated as follows. A lens substrate having a cured photochromic film was immersed in boiling water at 100° C. for 1 hr, cooled to room temperature, and then subjected to the crosshatch test in accordance with JISD-0202, within 30 min. The criteria for evaluation are given below. The adhesion referred here is the adhesion between the lens substrate and the cured photochromic film including the primer layer.

A: no removal
B: removal of less than 5% of the film
C: removal of 5% or more and less than 15% of the film
D: removal of 15% or more of the film The adhesion of the lens substrate prepared by the above-described method was ranked as A.

Examples 2 to 10

By a similar method to that for preparing primer composition (A) in Example 1, primer compositions (B) to (G) were prepared by mixing the components shown in Table 1. Then, cured photochromic films were prepared and appearance and adhesion thereof were evaluated by a similar method to that in Example 1 except that lens substrates, primer compositions, and spin-coating apparatuses shown in Table 2 were used. The results were summarized in Table 2.

Comparative Examples 1 to 4

Cured photochromic films were prepared and appearance and adhesion thereof were evaluated by a similar method to that in Example 1 except that lens substrates, primer compositions, and spin-coating apparatuses shown in Table 2 were used. The results were summarized in Table 2.

TABLE 1

| Primer No. | Commercial Primer (parts by weight) | Diluting solvents (parts by weight) | Leveling agent (part by weight) |
|---|---|---|---|
| A | Takeseal PFR402TP-4 50 | Ethyl acetate 50 | FZ-2104 0.03 |
| B | Takeseal PFR402TP-4 70 | Ethyl acetate 30 | FZ-2104 0.015 |
| C | Takeseal PFR402TP-4 60 | Ethyl acetate/ Butyl acetate 15/15 | L-7001 0.03 |
| D | Takeseal PFR4 80 | Ethyl acetate 20 | L-7001 0.03 |
| E | Takenate M-402P 50 | Ethyl acetate 50 | FZ-2104 0.03 |
| F | BURNOCK DM652 75 | Ethyl acetate 25 | FZ-2104 0.03 |
| G | Urethane Primer06 80 | Ethyl acetate 20 | L-7001 0.03 |

TABLE 2

Figure 6:
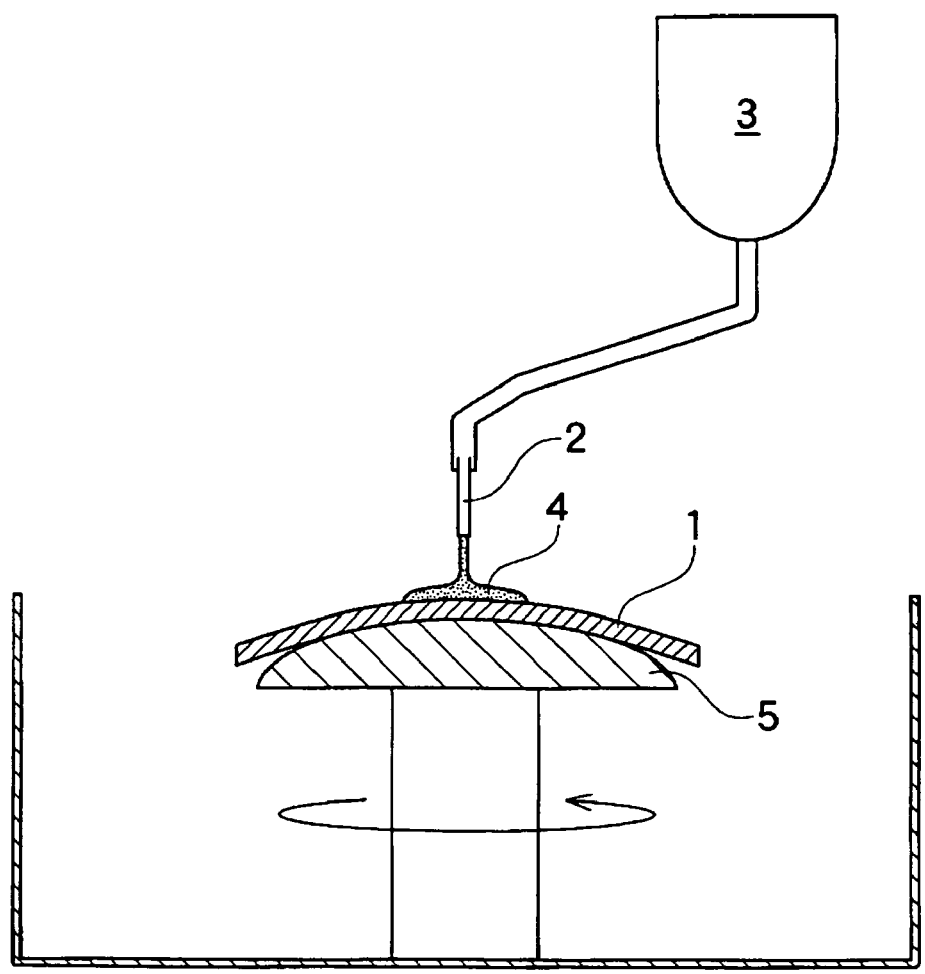
FIG. 6 is a sectional view illustrating a spin-coating apparatus conventionally used.

| No. | Lens substrate | Primer composition | Spin-coating apparatus | Appearance | Adhesion |
|---|---|---|---|---|---|
| Example 1 | CR | A | FIG. 4 | Good | A |
| Example 2 | CR | A | FIG. 3 | Good | A |
| Example 3 | CR | A | FIG. 2 | Good | A |
| Example 4 | CR | A | FIG. 1 | Good | A |
| Example 5 | MRA | B | FIG. 2 | Good | A |
| Example 6 | MRB | C | FIG. 4 | Good | A |
| Example 7 | TE | D | FIG. 3 | Good | A |
| Example 8 | SE | E | FIG. 4 | Good | A |
| Example 9 | SPL | F | FIG. 5 | Good | A |
| Example 10 | MRB | G | FIG. 1 | Good | A |
| Comparative Example 1 | CR | A | FIG. 6 | Poor | A |
| Comparative Example 2 | MRA | B | FIG. 6 | Poor | A |
| Comparative Example 3 | MRB | D | FIG. 6 | Poor | A |

TABLE 2-continued

| No. | Lens substrate | Primer composition | Spin-coating apparatus | Appearance | Adhesion |
|---|---|---|---|---|---|
| Comparative Example 4 | SE | F | FIG. 6 | Poor | A |

The invention claimed is:

1. A method for producing a laminate comprising:
spin-coating a coating substrate with a coating composition containing a moisture-curing polyurethane resin to form a coating film on the coating substrate, wherein a coating mist that is spun-off from the coating composition of the coating substrate during the coating process is prevented from being redeposited to the coating film being formed,
wherein the spin-coating step is carried out by using a spin-coating apparatus comprising a cylinder member installed in a lower chamber, a rotatable substrate supporting device housed in the cylinder member and a ceiling member to support the cylinder member,
wherein at least one exhaust port is provided at the lower chamber,
wherein the cylinder member includes openings at the upper and bottom ends thereof, and
wherein the distance between the coating substrate and the cylinder member is from approximately 5 mm to 50 mm.

2. The method of claim 1, wherein the at least one exhaust port is provided at the bottom end of the lower chamber.

3. The method of claim 1, wherein the at least one exhaust port is provided at the sidewall of the lower chamber.

4. The method of claim 1, wherein the at least one exhaust port is provided at both the bottom end and the side wall of the lower chamber.

5. The method of claim 1, wherein the cylinder member is widened toward the bottom.

6. The method of claim 1, wherein the opening at the bottom end of the cylinder member is larger than the opening at the upper end of the cylinder member.

7. The method of claim 1, wherein the ceiling member extends from the upper end of the lower chamber to the upper end of the cylinder member in a consecutive manner.

8. The method of claim 1, wherein the ceiling member has an opening at the center part so that the cylinder member is hung downward from this opening.

9. The method of claim 1, wherein the spin-coating apparatus has a top cover.

10. The method of claim 9, wherein at least one exhaust port is provided at the top cover.

11. The method of claim 1, wherein the bottom surface of the lower chamber has an inclined portion toward the periphery and a flat portion at the middle.

* * * * *